United States Patent [19]
van Os

[11] Patent Number: 4,594,939
[45] Date of Patent: Jun. 17, 1986

[54] METHOD FOR CONTROLLING THE GAP PRESENT BETWEEN THE WALL OF A CYLINDER BARREL AND A BALL PISTON AND APPARATUS EMBODYING THE METHOD

[75] Inventor: Cornelis J. van Os, Emmen, Netherlands

[73] Assignee: Noord-Nederlandsche Machinefabriek b.v., Winschoten, Netherlands

[21] Appl. No.: 657,044

[22] Filed: Oct. 2, 1984

Related U.S. Application Data

[63] Continuation of Ser. No. 349,966, Feb. 18, 1982, abandoned.

[30] Foreign Application Priority Data

Feb. 20, 1981 [NL] Netherlands .................. 8100867

[51] Int. Cl.⁴ .......................................... F01B 11/02
[52] U.S. Cl. .................................. 92/169; 92/171; 92/172

[58] Field of Search ............. 92/86.5, 127, 169, 168, 92/171, 172

[56] References Cited

U.S. PATENT DOCUMENTS

| | | | |
|---|---|---|---|
| 2,707,002 | 4/1955 | Harris | 92/172 |
| 2,934,093 | 4/1960 | Bleasdale | 92/171 |
| 3,071,114 | 1/1963 | Hardy, Sr. | 92/172 |
| 3,122,066 | 2/1964 | Pesman | 92/169 |
| 3,490,344 | 1/1970 | Archer et al. | 92/169 |
| 3,514,113 | 5/1970 | Weiswarm | 92/168 |
| 3,862,664 | 1/1975 | Skelly | 92/169 |
| 4,334,822 | 6/1982 | Rossmann | 415/127 |

Primary Examiner—Sheldon J. Richter
Assistant Examiner—Randolph A. Smith
Attorney, Agent, or Firm—Irvin A. Lavine

[57] ABSTRACT

A method of, and apparatus for, controlling the gap between the wall of a cylinder and a ball piston or a piston of comparable form, in particular suitable for use in a hydraulic ball piston engine. According to the invention a pressure is exerted on the outside of the cylinder, which pressure is comparable to the instantaneous pressure in the cylinder.

14 Claims, 5 Drawing Figures

METHOD FOR CONTROLLING THE GAP PRESENT BETWEEN THE WALL OF A CYLINDER BARREL AND A BALL PISTON AND APPARATUS EMBODYING THE METHOD

This application is a continuation, of application Ser. No. 349,966, filed Feb. 18, 1982.

The invention relates to a method of controlling the gap present between the wall of a cylinder barrel and a ball piston, and to apparatus embodying said method. In this specification ball piston means a spherical piston or one comparable therewith in form with regard to its sealing length, as will be explained in more detail hereinafter.

It is known that in hydraulic or pneumatic systems, a gap should be present between a piston housed in a cylinder and reciprocating therein and the cylinder wall. In fact, in the absence of such a gap, the piston could seize, and no lubrication between piston and cylinder wall would be possible.

On the other hand, such a gap should be as small as possible, or there will be undue losses through leakage of the pressure fluid.

In a practical situation, there is a higher pressure in the cylinder on one side of the piston than on the other side of the piston. This difference in pressure has such an effect on the leakage which occurs that, according as the pressure difference is increased, so the losses through leakage through the gap increase. On the one hand, this is a direct result of the difference in pressure, and on the other hand, a result of expansion of the cylinder, which depends on the level of the operating pressure.

The result of all this may be that leakage loss which is acceptable at a low difference in pressure on opposite sides of the piston housed in a cylinder increases to utterly unacceptable values at higher pressure differentials. In fact, leakage resulting from an increase in pressure increases according to a linear function, but leakage resulting from an increase in gap is increased exponentially.

Furthermore, at high operating pressures very thick cylinder walls are required to absorb the material stresses which occur.

There is accordingly a need for a method of controlling the gap width, and hence also the leakage losses which occur in operation, and further to keep the thickness of the cylinder wall within bounds.

Means which to a certain extent affect the gap width, and limit it at higher pressures are already known, for example, in the form of specially shaped sleeves or the like. It is an object of the present invention, however, to provide a method that can be used without the piston being provided with special sealing means, and which is particularly suitable for use in so-called ball pistons or pistons which, as regards form, are comparable therewith, and at relatively high pressure. One example of the use of ball pistons in cylinders in which high pressures may occur, and for which the method according to the present invention is highly suitable, is a high-torque hydraulic ball piston motor. Such motors are commercially available. In Dutch patent application No. 80,00115, for example, such a motor is described.

The invention is not, however, limited to the use in hydraulic ball piston motors.

In order to overcome the problems outlined in the above, a method of the kind described is characterized in that a pressure is exerted on the outside of the cylinder barrel, which pressure is comparable to the instantaneous operating pressure within the cylinder barrel.

The invention will be described in more detail hereinafter with reference to the accompanying drawings.

FIG. 1 diagrammatically shows a cylinder housing a spherical piston;

FIG. 2 shows an apparatus as shown in FIG. 1, and some forces operative when the invention is used;

FIG. 3 diagrammatically shows a part of an apparatus embodying the invention;

FIG. 6 showns an apparatus as shown in FIG. 2 in which the cylinder has been caused to arch about the piston by the forces operative when the invention is used.

Figure 1:
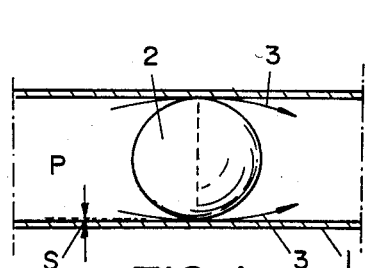

FIG. 1 shows a cylinder 1 housing a ball 2 functioning as a piston 2, and capable of reciprocating relatively to the cylinder. In the past it has already been proposed, instead of the conventional right-cylindrical pistons to use ball pistons. In spite of the fact that the sealing length, or rather the length of the gap s between the surface of the ball and the inner surface of the cylinder, as viewed in the longitudinal direction of the cylinder, is rather short, so that large leakage losses could be expected, it has been found that for certain applications, in which low pressures are used, a ball piston is quite suitable. At higher pressures, however, the leakage losses increase in a manner which is intolerable for most applications.

The same applies to pistons having a form which, as regards sealing length, is comparable to that of the ball piston, so that the invention is also applicable to such pistons. Examples are a flattened ball piston, a low-height piston, or a piston having a flange directed to the cylinder wall, which flange is short as viewed in the direction of movement.

In the situation shown in FIG. 1, an operating pressure p prevails left of ball piston 2. As a result of this operating pressure p, which is brought about by a pressure fluid, e.g. a hydraulic oil, a certain leakage current occurs through gap s, indicated by arrows 3. According to the invention, this leakage current can be reduced by causing an elevated pressure to prevail at the outside of the cylinder wall, which for example may be equal to pressure p, but, as will become apparent from the following, may have a different value.

Figure 2:
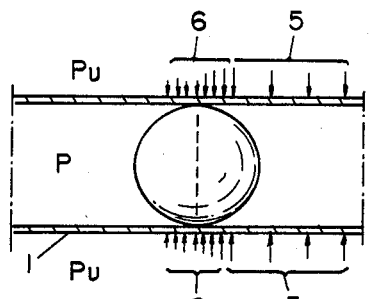

In the situation shown in FIGS. 2 and 6, a pressure pu prevails on the outside of the cylinder wall. If p=pu, the same pressure prevails on opposite sides of the cylinder wall left of the transverse plane, indicated at 4, and containing the centre of the ball piston, and to the right of plane 4 approximately normal atmospheric pressure may prevail on the inside of the cylinder, but the operating pressure on the outside. The resulting external overpressure is roughly indicated by arrows 5.

Owing to the external overpressure prevailing on the right-hand side of plane 4, the cylinder there tends to shrink and, as it were to arch slightly about the ball piston, as shown in FIG. 6.

In the example selected, to the left of the transverse plane 4 the same pressure prevails inside and outside of the cylinder. As the cylinder wall has a certain thickness, the outer surface area of the cylinder is larger than the inner surface area, the result of which is that a larger force acts on the cylinder's outer wall than on its inner wall. The result of all this is that, starting from a state of equilibrium, when the operating pressure is increasing, the cylinder also tends to shrink to the left of plane 4, as shown in FIG. 6, owing to which gap s will become smaller with increasing operating pressure, so that, contrary to what one would expect, leakage losses need not increase.

This effect can be explained as follows. Let it be supposed that a cylinder barrel has an interior diameter Di and an exterior diameter Du, and that a pressure p=pi prevails within the cylinder barrel, and a pressure p=0 outside of the cylinder. As a result, in the cylinder barrel wall, an average tensile stress arises per unit length in each cross-section as follows:

$$T_{gi} = \frac{Di \cdot Pi}{(Du - Di)}$$

as can be calculated in known manner using techniques conventional in mechanics.

Similarly, in case a pressure p=0 prevails within the cylinder barrel and a pressure p=pu outside the cylinder barrel, an average compressive stress per unit length will arise in each cross-section of the cylinder barrel wall as follows:

$$T_{gu} = -\frac{Du \cdot Pu}{(Du - Di)}$$

If now, both within and without the cylinder a pressure p=pc prevails, the following average stress will arise in each cross-section:

$$T_{gi} = \frac{Di \cdot Pc - Du \cdot Pc}{(Du - Di)} = -Pc$$

This is a compressive stress. According to Hooke's Law, this results in a reduction of the diameter, which is dependent on the modulus of elasticity of the material of the cylinder barrel.

In summary it can be stated, therefore, that, in the situation of FIGS. 2 and 6, a shrinking effect occurs to the left of plane 4, in spite of the fact that the pressure within the cylinder barrel equals the pressure outside it. To the right of plane 4 a stronger shrinking effect occurs, because the pressure without the cylinder barrel exceeds that within it.

Furthermore, in the area of the gap proper, which in fact forms the connection between the loaded side of the piston and the unloaded side of the piston, a pressure drop occurs on the inside of the cylinder, which in the situation shown in FIGS. 2 and 6 corresponds to a shrinking effect in this area of the cylinder, as symbolized by arrows 6, which effect increases from the loaded side of the piston to its unloaded side.

The above shows that by virtue of the use of the invention, the leakage losses along a ball piston or comparable piston housed in a cylinder, decrease rather than increase when the operating pressure is increased.

The extent to which the leakage losses decrease when the operating pressure is increased can be controlled, for example, by selecting an external pressure unequal to the internal pressure, for example, smaller. This can be realized in practice by using a pressure reducing valve in the conduit which supplies the pressure fluid to the space present around the cylinder barrel. Such a reducing valve may be of such design that the pressure is not reduced until above a pre-determined threshold value.

These features may be desirable in some cases to ensure that the piston is at all times sufficiently lubricated, and/or to prevent seizure.

Furthermore it is possible, for example, to keep the leakage losses constant within a large range of pressure values by suitably controlling the pressure generated on the outside of the cylinder. This may be based, for example, on the magnitude of the leakage flow of the pressure fluid along the piston.

The shrinking effect which occurs in a practical situation depends, among other parameters, on the wall thickness of the cylinder barrel, at any rate in the region where the internal pressure is unequal to the external pressure, and on the kind of material of the cylinder barrel. If data about these are known, the shrinking effect and the leakage losses which occur can be calculated for the operating pressures contemplated.

EXAMPLE

In a cylinder barrel of steel having a modulus of elasticity $E=2.1\times 10^6$ kg/cm$^2$, an internal diameter Di=60 mm, and an external diameter Du=80 mm, with an operating pressure of $P_1$=210 bars above the piston, which operating pressure also prevails outside the cylinder barrel, and a pressure $P_2$=0 bar prevailing under the piston, the half diameter is reduced above the piston by 0.0036 cm=3.6 μm, and below the piston the half diameter is reduced by 0.0144 cm=14.4 μm. In the region of the piston proper, therefore, the gap is reduced by a value ranging from 3.6 μm to 14.4 μm.

As, in manufacturing pistons and cylinders, present day techniques readily permit accuracy down to one micron, the shrinking effect which occurs is of great practical importance.

Figure 3:
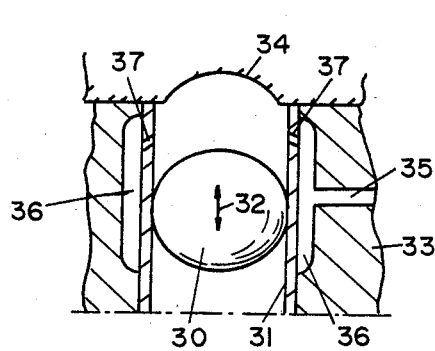

FIG. 3 shows a part of a ball piston motor in which the invention is used. A ball piston 30 is housed in a cylinder barrel 31 for up and down movement as indicated by double arrow 32. The cylinder barrel is placed in a motor block 33, diagrammatically indicated, and is closed on one side by a cylinder head 34. Through a suitable bore 35 in the motor block, a pressure fluid can be supplied to a hollow space 36 formed around the cylinder barrel in the motor block. Through one or more bores 37 in the wall of the cylinder barrel, the pressure fluid is also supplied to the space above the piston.

Accordingly, the operating pressure prevails both within the cylinder barrel in the space above the piston and around the cylinder barrel in cavity 36, and approximately atmospheric pressure prevails under the piston.

In a motor designed in this manner the shrinking effect contemplated occurs, and the gap between the piston and the cylinder can be controlled in the manner described hereinbefore.

Such a motor is suitable for high operating pressures without it being necessary for the cylinder barrel to have an extremely thick wall. This is a result of the fact that, as is well known, a cylinder can be loaded with a higher external overpressure than it can be loaded with an internal overpressure.

An additional advantage is that such a relatively thin cylinder barrel can be replaced more easily and more cheaply than a very thick cylinder barrel.

As stated before, in certain circumstances it may be of importance to have a pressure of a different value within the cylinder above the piston from the pressure around the cylinder barrel.

Thus it is possible, for example, that in the motor shown in FIG. 3, the operating pressure, which also prevails in cavity 36 on the outside of the cylinder, becomes so high in certain conditions, that owing to the shrinking effect associated therewith the piston seizes. Seizure can be prevented by ensuring that in such a case the pressure prevailing in cavity 36 around the cylinder barrel remains lower than the operating pressure.

In practice this can be realized by supplying the pressure fluid through separate conduits and/or passages to the cylinder and the cavity around the cylinder barrel, and to provide a pressure reducing valve in the conduit passing to the cavity.

Figure 4:
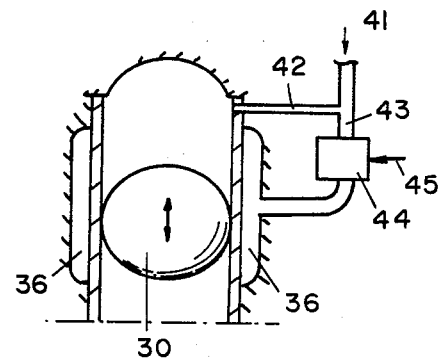
FIG. 4 shows a variant of the invention.

All this is shown diagrammatically in FIG. 4. A conduit 40 to which, as indicated by an arrow 41, pressure fluid is supplied under the operating pressure, is bifurcated into a conduit 42 passing to the chamber above piston 30 and a conduit 43 passing to the cavity 36 around cylinder barrel 31, and in which a pressure reducing valve 44, shown diagrammatically, is mounted. Valve 44 may be designed so that it does not begin to operate until the fluid pressure has a pre-determined value. The valve may also be designed to be controllable, as indicated in FIG. 4 by an arrow 45. Thus, for example, the valve could be controlled depending on the fluid leakage flow from the chamber under the piston, which is an indication for the prevailing gap width. The pressure in the cavity is then reduced if the flow of leakage oil becomes too small and the piston threatens to seize.

In principle it is also possible for the pressure in the cavity around the cylinder barrel to be higher than the operating pressure. In this manner it is possible to compensate for a gap between piston and cylinder which is too large initially or for one that has become unduly enlarged through wear.

Such a relatively elevated pressure in the cavity can be produced by means of a special device, e.g., a pump or a pressure accumulator, or by a pressure limiting valve in the conduit leading to the chamber above the piston.

In a similar manner, as shown hereinbefore, it is possible to compensate for a gap that is initially too small by causing the pressure in the cavity around the cylinder to be lower than the operating pressure.

Furthermore, it is possible to compensate for dimensional changes resulting from temperature effects by controlling the pressure prevailing in the cavity.

Figure 5:
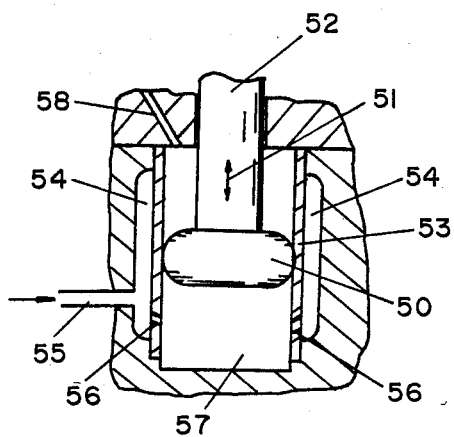
FIG. 5 shows a different apparatus embodying the principle of the invention.

FIG. 5 shows a different use of the concept according to the invention. A piston 50 of a press can move up and down, as indicated by a double arrow 51 in piston rod 52, within a cylinder barrel 53. Provided around cylinder barrel 53 is a cavity 54, to which a pressure fluid can be supplied through a passage 55. Cavity 54 is in communication through a bore 56 in the cylinder wall with the chamber 57 under the piston, so that the operating pressure again prevails both within and without the cylinder barrel. For the sake of completeness, a passage 58 is indicated for pressure fluid escaping past the piston and for returning the piston to its initial position.

It is observed that the use of the concept according to the invention is not limited to a ball piston motor or a press, but that other uses, possibly in modified form, are conceivable. Such uses, and also obvious variants of the inventive concept, are considered to fall within the scope of the invention.

What I claim is:

1. Hydraulic apparatus comprising:
   a cylinder having a longitudinal axis and substantially concentric inside and outside walls, said cylinder being capable of having its inside diameter elastically changed by differential forces on said outside and inside walls,
   a pressure fluid contained in said cylinder,
   a piston closely adjacent said inside wall of said cylinder, said piston having a sealing length portion the cross-section of which in a plane containing said axis is defined in part by a pair of opposed convex arcs and a high pressure side along said axis on one side of its sealing length portion and a low pressure side along said axis on the other side of its sealing length portion, said sealing length portion being slightly smaller than the inside diameter of the cylinder surrounding the high pressure side of the piston, thereby forming a gap with said inside wall for allowing fluid flow from said high pressure side to said low pressure side of said piston, and
   means for causing the inside diameter of said cylinder to arch around said sealing length portion of said piston on said low pressure side thereof by exerting a pressure on the outside wall of said cylinder.

2. Apparatus as claimed in claim 1, the cross-section of said sealing length portion in a plane perpendicular to said axis being substantially circular.

3. Apparatus as claimed in claim 1, said causing means comprising:
   means defining a hollow space about and substantially coextensive with said outside wall, and
   means for generating a pressure in the hollow space, whereby differential forces are exerted on said inside and outside walls.

4. Apparatus as claimed in claim 3, wherein said piston is a ball piston.

5. Apparatus as claimed in claim 3, further comprising a conduit for placing the hollow space in communication with the same source of pressure fluid as in the working space in said cylinder.

6. Apparatus as claimed in claim 5, wherein said conduit terminates in the hollow space, and said cylinder is provided with at least one drilled channel through said inside and outside walls, which connects the working space within said cylinder with the hollow space.

7. Apparatus as claimed in claim 5, further comprising a pressure reducing valve in said conduit.

8. Apparatus as claimed in claim 7, wherein said pressure reducing valve does not reduce the fluid pressure below a pre-determined pressure value, and does reduce the fluid pressure above such pressure value.

9. Apparatus as claimed in claim 7, further comprising a measuring device for measuring the magnitude of the leakage flow of the pressure fluid, said measuring device controlling said pressure reducing valve.

10. Apparatus as claimed in claim 9, further comprising means for increasing the pressure of the pressure fluid in the hollow space relative to the instantaneous working pressure in said cylinder coupled with said conduit.

11. A method of controlling the gap between a piston and a cylinder, comprising the steps of:
    providing a cylinder having a longitudinal axis and substantially concentric inside and outside walls, the cylinder being capable of having its inside diameter along the length thereof elastically changed by differential forces on the inside and outside walls thereof, providing a pressure fluid in the cylinder, providing a piston having a sealing length portion the cross-section of which in a plane containing the cylinder axis is defined in part by a pair of opposed convex arcs and the cross-section of which in a plane perpendicular to the cylinder axis is substantially circular, the piston having a high pressure side along the cylinder axis on one side of its sealing length portion and a low pressure side along the cylinder axis on the other side of its sealing length portion, the sealing length portion being closely adjacent the inside wall of the cylinder and being slightly smaller than the inside diameter of the cylinder surrounding the high pressure side of the piston, thereby providing a gap for fluid flow from the high pressure side to the low pressure side of the piston, and causing the inside diameter of the cylinder to arch around the sealing length portion of the piston on the low pressure side thereof by exerting a pressure on the outside wall of the cylinder.

12. The method of claim 11, wherein in said conforming step, the pressure on the outside wall of the cylinder is reduced at least in a pre-determined operating pressure range.

13. The method of claim 11, wherein in said conforming step, the pressure exerted on the outside wall of the cylinder is controlled in dependence on the magnitude of the leakage flow of the pressure fluid along the piston.

14. The method of claim 11, wherein said piston is a ball piston.

* * * * *